(12) United States Patent
Klein et al.

(10) Patent No.: US 10,539,249 B2
(45) Date of Patent: Jan. 21, 2020

(54) ELECTRICALLY DRIVABLE VALVE FOR CONTROLLING VOLUMETRIC FLOWS IN A HEATING AND/OR COOLING SYSTEM OF A MOTOR VEHICLE

(71) Applicant: MAHLE International GmbH, Stuttgart (DE)

(72) Inventors: Hans-Peter Klein, Leutenbach (DE); Hans-Ulrich Steurer, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 136 days.

(21) Appl. No.: 14/929,691

(22) Filed: Nov. 2, 2015

(65) Prior Publication Data

US 2016/0053911 A1 Feb. 25, 2016

Related U.S. Application Data

(63) Continuation of application No. PCT/EP2014/058383, filed on Apr. 24, 2014.

(30) Foreign Application Priority Data

May 3, 2013 (DE) .................. 10 2013 208 192

(51) Int. Cl.
*F16K 31/02* (2006.01)
*F16K 11/074* (2006.01)
(52) U.S. Cl.
CPC ............ *F16K 31/02* (2013.01); *F16K 11/074* (2013.01)
(58) Field of Classification Search
CPC .. F16K 11/074; F16K 31/02; F01P 2007/146; F01P 7/16; F01P 7/165; F01P 2011/0228
USPC .................................................... 137/625.45
See application file for complete search history.

(56) References Cited

U.S. PATENT DOCUMENTS 5,529,026 A * 6/1996 Kurr .................. B60H 1/00485
123/41.1
5,950,576 A 9/1999 Busato et al.
6,371,060 B1 * 4/2002 Lehmann ................ F01P 7/167
123/41.1
(Continued)

FOREIGN PATENT DOCUMENTS

DE 43 24 749 A1 1/1995
DE 196 32 533 C1 10/1997
(Continued)

OTHER PUBLICATIONS

Machine Translation of (WO 2011086154 A1) PDF File Name: "WO2011086154A1_Machine_Translation.pdf".*

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

An electrically drivable valve for controlling volumetric flows in a heating and/or cooling system of a motor vehicle, including a housing, from which at least two channels, preferable an inlet channel and an outlet channel, branch off, wherein a disk-shaped valve body is arranged in the housing, which valve body can be rotated about an axis of a drive shaft and has a control contour. For a valve that is simple to produce in regard to the design of the valve, the single control contour of the valve body controls a bypass circuit and a cooler circuit of the heating and/or cooling system.

9 Claims, 6 Drawing Sheets

(56) References Cited

U.S. PATENT DOCUMENTS

| | | | |
|---|---|---|---|
| 8,701,603 B2 | 4/2014 | Warnery et al. | |
| 2005/0034688 A1* | 2/2005 | Lelkes | F01P 7/167 |
| | | | 123/41.01 |
| 2007/0234978 A1 | 10/2007 | Pipkorn et al. | |
| 2007/0234979 A1 | 10/2007 | Pipkorn et al. | |
| 2012/0080629 A1 | 4/2012 | Rogge et al. | |
| 2012/0198992 A1* | 8/2012 | Futakuchi | F04B 27/1804 |
| | | | 91/505 |
| 2014/0224361 A1* | 8/2014 | Warnery | F01P 7/167 |
| | | | 137/625 |

FOREIGN PATENT DOCUMENTS

| | | | | |
|---|---|---|---|---|
| DE | 199 32 313 A1 | 1/2001 | | |
| DE | 102 23 362 A1 | 5/2003 | | |
| DE | 10 2006 053 310 A1 | 5/2008 | | |
| DE | 10 2009 009 854 A1 | 9/2010 | | |
| DE | 10 2009 024 317 A1 | 12/2010 | | |
| DE | 10 2009 025 360 A1 | 12/2010 | | |
| DE | 20 2010 002 421 U1 | 5/2011 | | |
| DE | 10 2011 081 183 A1 | 2/2013 | | |
| WO | WO 03/036145 A1 | 5/2003 | | |
| WO | WO 03036145 A1 * | 5/2003 | | F16K 3/06 |
| WO | WO 2011/086154 A1 | 7/2011 | | |
| WO | WO 2011086154 A1 * | 7/2011 | | F01P 7/167 |

\* cited by examiner

ELECTRICALLY DRIVABLE VALVE FOR CONTROLLING VOLUMETRIC FLOWS IN A HEATING AND/OR COOLING SYSTEM OF A MOTOR VEHICLE

This nonprovisional application is a continuation of International Application No. PCT/EP2014/058383, which was filed on Apr. 24, 2014, and which claims priority to German Patent Application No. 10 2013 208 192.8, which was filed in Germany on May 3, 2013, and which are both herein incorporated by reference.

BACKGROUND OF THE INVENTION

Field of the Invention

The invention relates to an electrically drivable valve for controlling volumetric flows in a heating and/or cooling system of a motor vehicle.

Description of the Background Art

Thermal management in cooling systems of motor vehicles is carried out today to reduce consumption, to reduce $CO_2$ emissions, and to increase comfort. Depending on the thermal requirements, the coolant stoppage is realized in this case during warm-up, the coolant temperature of the internal combustion engine is controlled according to load conditions, and one or more auxiliary circuits such as the transmission fluid, engine oil, or heating circuit are controlled or switched. Motor vehicle cooling systems in this case are formed of an internal combustion engine, a cooling element, a pump, and a control valve.

A valve which is electrically driven by a DC motor and has a disc-shaped valve body is known from U.S. Pat. No. 5,950,576 A. In this case, the coolant is conducted from one side into the interior of the valve and through the valve body, redirected by 180° and again conducted through the valve body, and taken out on the same side of the valve. High pressure losses arise here because of the redirection. It is especially disadvantageous that the valve body in this design has three openings for two inlet ports and one outlet port; this results in a high sealing cost.

A valve with disc-shaped valve body is also disclosed in DE 10 2006 053 310 A1. The valve has a housing with at least one inlet channel and at least one outlet channel, whereby the disc-shaped valve body is mounted rotatably about the axis of a shaft. Moreover, the valve body has rotation angle-dependent opening characteristics for controlling volumetric flows, whereby a plurality of discrete openings are provided to connect an individual inlet channel to the one outlet channel. When the valve body moves, this has the result that the edges of the plurality of openings slide constantly over the seals and this thus causes greater wear on the seal. The inflow and outflow of the coolant occur axially to the rotation axis in the opposite direction.

It is disadvantageous for electrically driven valves that extensive sealing material is necessary for sealing the plurality the openings, as a result of which the valve is structurally complicated and very cost-intensive. At the same time, the heavy wear of the seals shortens the lifetime of the valve.

SUMMARY OF THE INVENTION

It is therefore an object of the invention to provide an electrically drivable valve which has a structurally simple design and a long lifetime.

In an exemplary embodiment, the only one control contour of the valve body controls a bypass circuit and a radiator circuit of the heating and/or cooling system. This has the advantage that the sealing expenses decline when only one control contour of the valve body is used. At the same time, seal wear is reduced, as a result of which the valve's lifetime is increased. The only one control contour in this case forms only one passage for the coolant on the valve body. Such a valve can be used both as an ingress regulator and egress regulator for the coolant of an internal combustion engine.

The control contour can be formed as an opening of the valve body which is shaped like a full circle. In the case of disc-shaped valve bodies, the construction expenses decline during the production of the valve, which reduces the cost.

The control contour can be formed by an outer shape of a circle-segment-like, full-surface valve body. In this case, a passage for the volumetric flow is created by the outer shape of the disc-shaped valve body, said shape which does not have the shape of a full circle; the passage allows a corresponding control depending on the valve body position.

In an embodiment, the control contour can be formed as a baffle on a lateral surface of the valve body. Such a baffle, extending approximately parallel to the housing, thereby advantageously has the function of controlling an additional coolant circuit. A heating circuit can already be released by means of this simple-to-produce baffle, for example, during the warm-up when the bypass and radiator circuits are still closed to increase the corresponding comfort in the passenger compartment, e.g., during winter operation.

In an embodiment, the valve body can be formed pivotable relative to the axis. In addition to the rotation of the valve body about the axis, the pivoting of the valve body relative to the rotation axis represents an additional degree of freedom in the movement of the disc-like valve body. This makes it possible to operate the valve body drive, formed as an electric motor, with a smaller force. The valve body mounted rotatably on the axis in this case easily changes its rotation angle variably depending on the instructions of a control device.

In an embodiment, the valve body can be formed of metal or of a coolant-resistant plastic, whereby the plastic preferably can contain glass fibers and/or additives that optimize sliding. The additives constitute a percentage between 10% and 70%. The use of additives that optimize sliding enables easy movement of the valve body in view of the reduced friction.

In an embodiment, the valve body on its surface can be provided with a seal for sealing against the housing. It is assured by means of such a seal that the volumetric flow to be controlled is influenced only by the control contour itself and that no leaks arise on the valve body.

The seal can be disposed in the housing to seal the valve body. The seals in this case can be formed particularly as molded seals and form a positive fit for sufficient sealing.

In an embodiment, the valve body, disposed on a shaft, together with the shaft or only the valve body, can be under a preload by means of at least one resilient element relative to an opening of at least one connecting piece. Due to this preload, it is possible that the valve body executes an adjusting movement in the case of a wearing seal in order not to exceed a leakage specified over the valve's lifetime.

In an embodiment, an expanding wax thermostat can be disposed in the housing as valve failure protection. The expanding wax thermostat assures sufficient cooling of the internal combustion engine when a critical coolant temperature is reached. Thermal damage in the heating and/or cooling system can be prevented as a result. The position of the expanding wax thermostat in the housing is the same when the valve is used either as an ingress or egress regulator.

According to an embodiment, the housing can have connections for the tubes of a separate expanding wax thermostat. Thus, the thermostat can also be disposed outside the valve, as a result of which it is easier to replace when necessary.

According to an embodiment, a housing wall of the actuator, by which the valve can be electrically drivable, can be at the same time a wall of the valve housing. Installation space can be saved as a result.

According to an embodiment, a position reset of the valve body can occur via, for example, a Hall sensor or a Hall switch.

According to embodiment, the reference points of the Hall switch can be formed via one or more mechanically formed end positions or via magnets.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
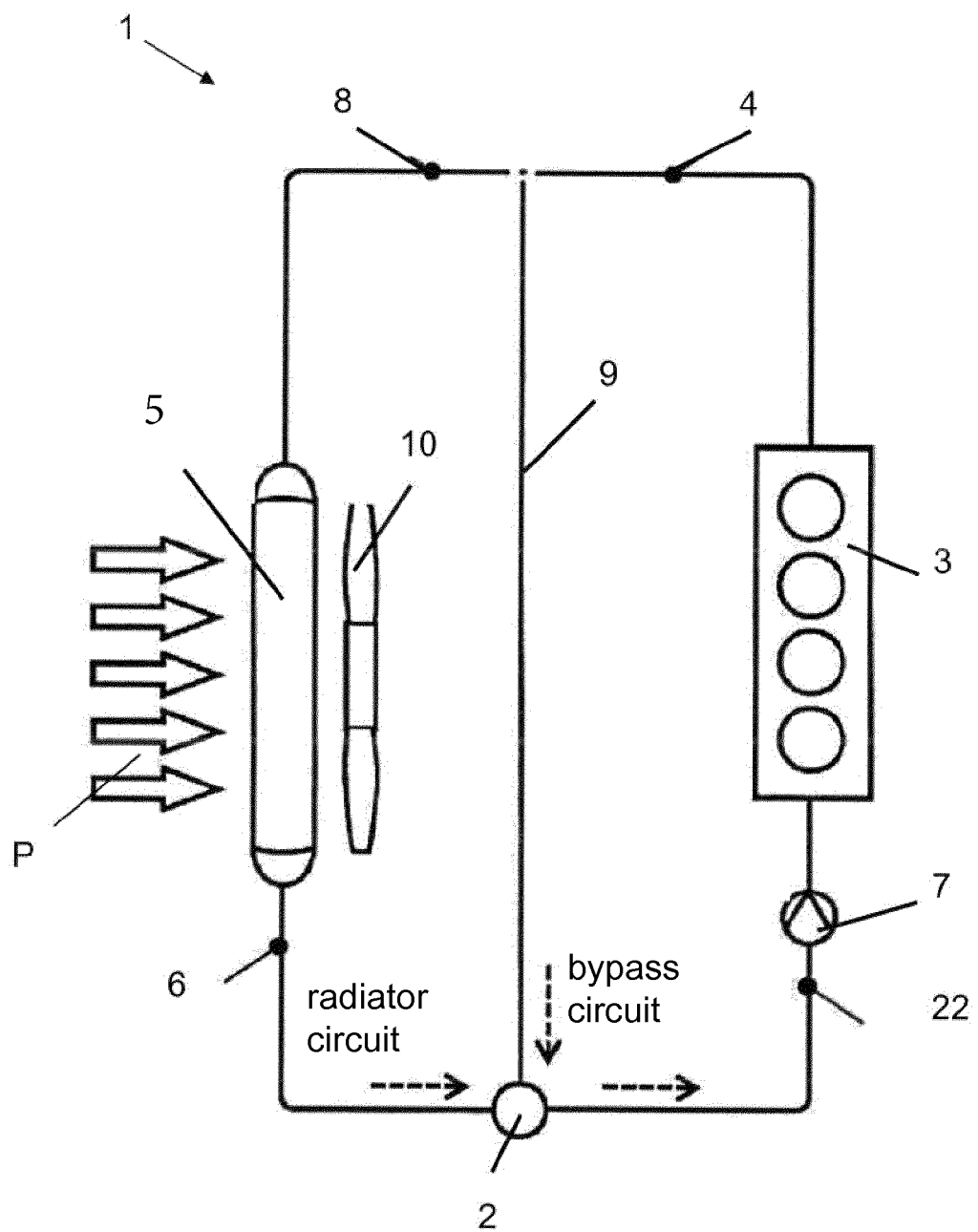
FIG. 1 shows a cooling circuit with the valve of the invention as an ingress regulator.

FIG. 1 shows a cooling circuit 1 of a motor vehicle with valve 2 of the invention as an ingress regulator. Cooling circuit 1 in this case has an internal combustion engine 3 whose engine outlet 4 is connected to a cooling element 5. Radiator return 6 is connected to valve 2. The outlet of valve 2 leads to intake side 22 of a pump 7, which in turn is connected to an internal combustion engine 3. A bypass or bypass circuit 9, which connects engine outlet 4 directly to valve 2 and thus again to pump 7 and internal combustion engine 3, is provided between engine outlet 4 and radiator inflow 8. Cooling element 5 is cooled by air (arrow P). A fan 10 is located behind cooling element 5.

Figure 2:
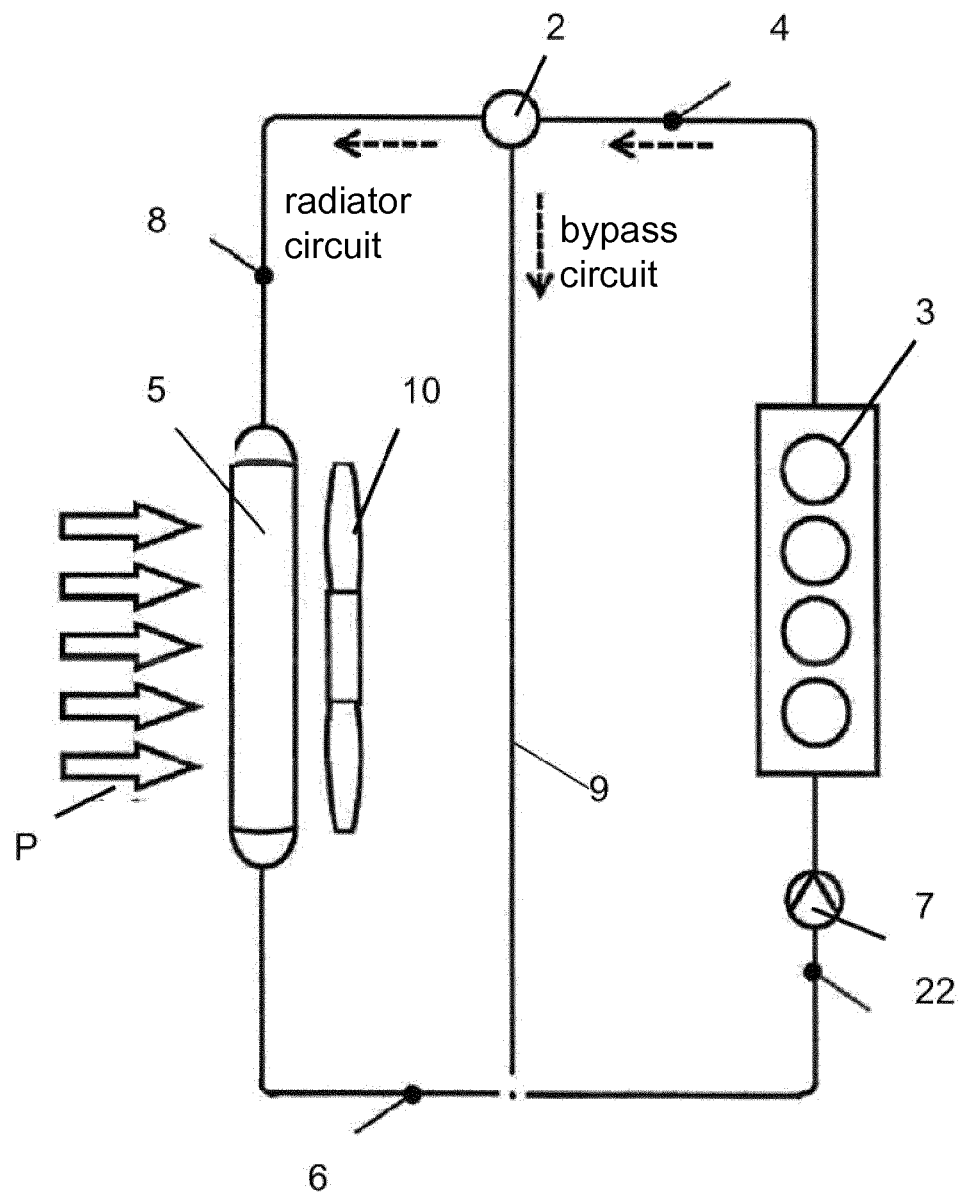
FIG. 2 shows a cooling circuit with the valve of the invention as an egress regulator.

FIG. 2 differs from FIG. 1 only in that valve 2 functions as an egress regulator and is therefore connected between engine outlet 4 and radiator inflow 8. At the same time, valve 2 controls bypass circuit 9, which connects engine outlet 4 to intake side 22 of pump 7.

In the case of valve 2 formed as an ingress regulator, simply stated the valve outlet goes to intake side 22 of pump 7, and bypass circuit 9 and radiator return 6 form the valve inlets. In a valve 2 used as an egress regulator, engine outlet 4 forms the valve inlet, whereas bypass circuit 9 and radiator inflow 8 form the two valve outlets.

Figure 3:
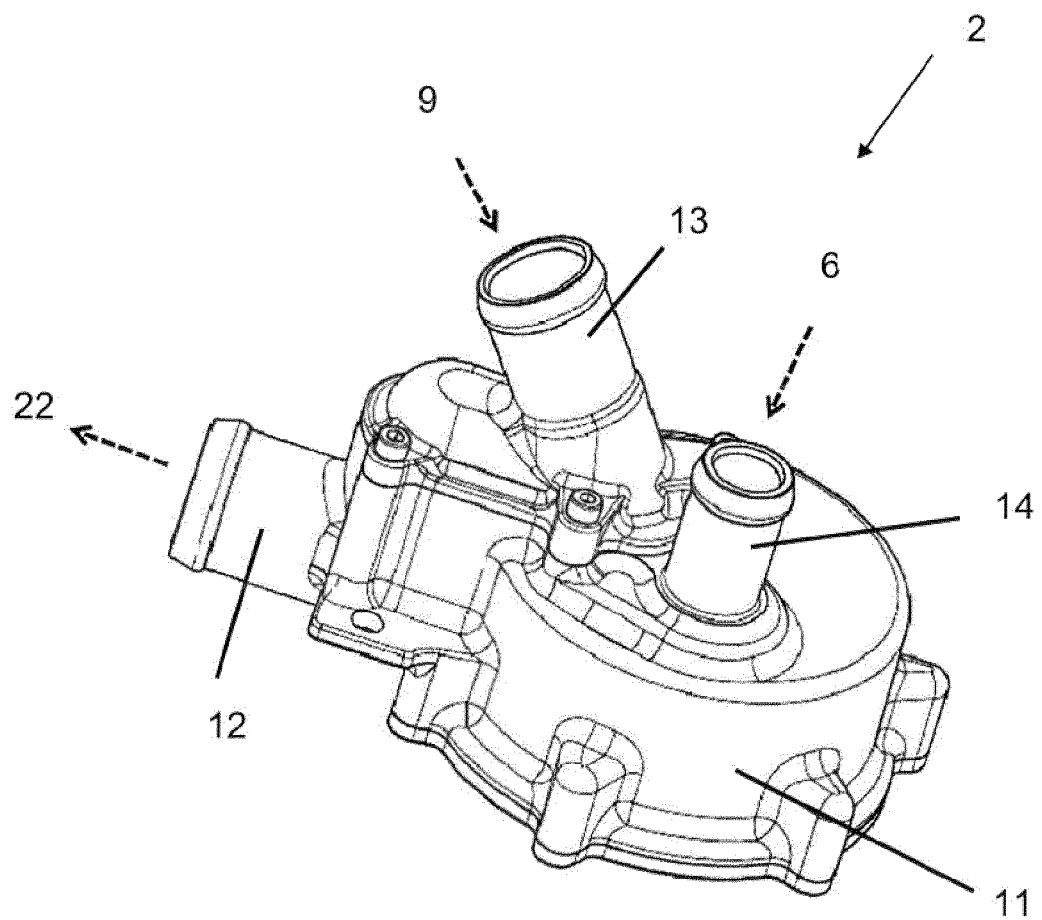
FIG. 3 shows an exemplary embodiment of the valve of the invention.

Valve 2 functioning as an ingress regulator is shown in FIG. 3. Valve 2 in this case comprises a housing 11, which has three connecting pieces 12, 13, 14. Connecting piece 12 here connects valve 2 to pump 7 and thus represents an outlet channel. Second connecting piece 13 connects valve 2 to bypass circuit 9, whereas third connecting piece 14 connects valve 2 to radiator return 6. Connecting pieces 13 and 14 in this case therefore represent inlet channels.

Figure 4A:
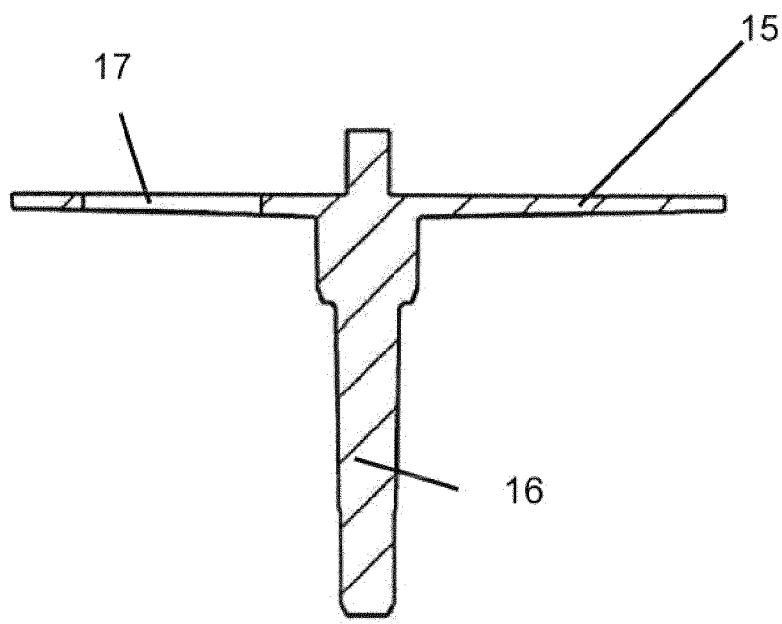
FIGS. 4a and 4b show exemplary embodiments of the valve body.
Figure 4B:
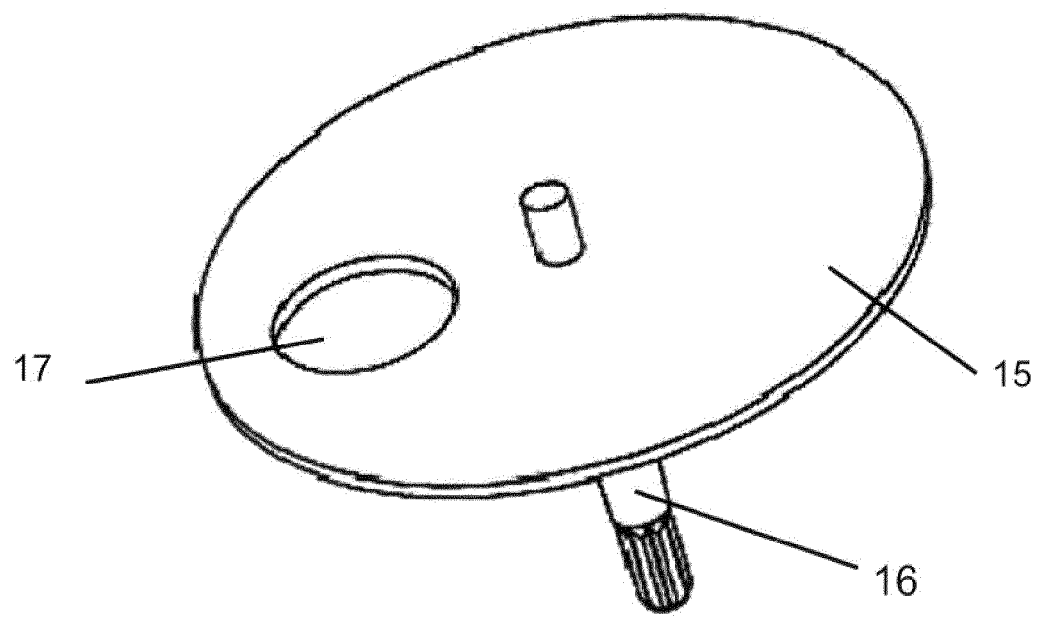

Valve body 15, as illustrated in FIGS. 4a and 4b, is formed as a full-circle-shaped, disc-shaped body, which has a decentered opening 17 as a control contour. A control contour in this case forms the only passage for the coolant within ingress or egress regulator 2, 3. The bypass circuit and the radiator circuit can be controlled by means of this one flat disc and the one opening 17, depending on whether valve 2 is used as the ingress regulator or as the egress regulator. If it were to be necessary that a plurality of coolant circuits are to be controlled, additional openings must be formed on disc-shaped valve support 15 in accordance with the number of the additional coolant circuits.

Figure 5A:
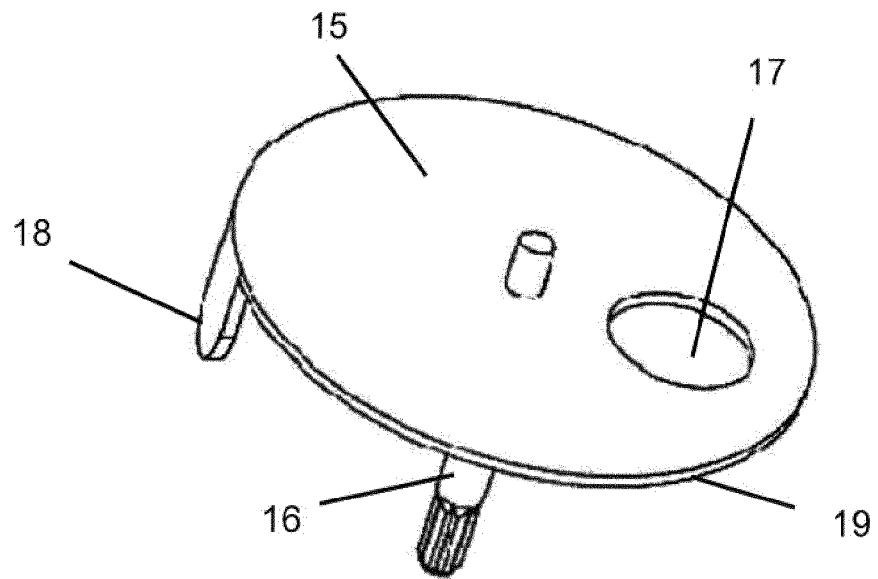
FIGS. 5a and 5b show exemplary embodiments of the valve body.

As is evident from FIG. 5, it is not absolutely necessary that an opening in valve body 15 must be designed absolutely as a control contour for controlling the volumetric flow of the coolant. Alternatively, FIG. 5a shows a control contour, which is formed as a baffle 18 on lateral side 19 of valve body 15. An additional coolant circuit can be controlled by means of said baffle 18. Thus, for example, during the warm-up of internal combustion engine 3 with a still closed bypass circuit or radiator circuit, a heating circuit can be released in this way in order to increase, e.g., the passenger comfort during winter operation. Baffle 18, however, also enables an uncontrolled inflow/outflow from additional coolant circuits into valve 2.

Figure 5B:
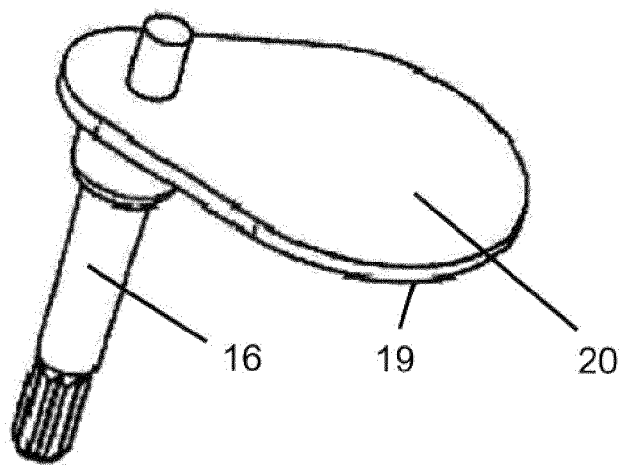

FIG. 5b shows a valve body 20 formed like a circle segment. Only the desired channel is closed by means of this circle-segment-like valve body 20, whereas opening 17 in the embodiment of valve body 15 according to FIG. 5a releases the desired ingress or egress connecting piece 12, 13, 14. In both cases, the flow entering through valve 2 runs approximately parallel to the rotation axis of valve body 15, 20 and thereby always in one direction.

Valve body 15 or 20 is made of a metal or of an injection-moldable plastic. In the case of the version made of plastic, it preferably contains glass fibers with a percentage between 10% and 70% and is resistant to the coolant. In addition, additives, optimizing sliding, such as PTFE (polytetrafluoroethylene) can be used in the plastic. Said sliding-optimizing additives reduce the friction of valve body 15, 20 on housing 11. Valve body 15, 20 in this case should have on its outer surface a flatness of less than +/−0.5 mm.

In addition, there are the options that the disc-shaped valve body 15, 20 has one or more recesses or that it is coated with a sealing material on its outer surface and/or lateral surface 19. Valve body 15, 20 can have raised areas on its surface or valve body 15, 20 can have non-penetrating recesses.

Valve body 15, 20 and shaft 16 can be a part that is made of plastic. Alternatively, valve body 15, 20 can also be injection molded, however, onto shaft 16 formed, for example, of steel. Alternatively, shaft 16 can be made at least partially continuous, valve body 15, 20 being mounted on it rotatably and pivotably relative to the axis of shaft 16. Alternatively, disc-shaped valve body 15, 20 can be attached axially movably to said shaft 16.

An outer contour or an inner contour, which represent a positive-locking connection to an electric drive (not shown further), can be formed at one or at both ends of shaft 16 of valve body 15, 20.

Valve body 15 or 20, furthermore, can be under preload by means of mechanical, preferably resilient elements against one or more of the openings of connecting pieces 13, 14 as a whole, i.e., together with shaft 16 or only on shaft 16 itself, if valve body 15 and shaft 16 are made separately. Due to this preloading, valve body 15 or 20 can perform an adjusting movement in the case of a wearing seal and thus a specified leakage is not exceeded over the lifetime of valve 2.

Advantageously, the mechanical, particularly resilient element is designed such that with a completely closed valve 2 (e.g., coolant is in warm-up) and simultaneously high speed of pump 7 and thus a high applied hydraulic differential pressure, valve body 15 or 20 is pushed away from the seal (not shown further) and coolant can thus flow. This is helpful particularly whenever during a cold start the driver of the motor vehicle immediately reaches a high speed, as a result of which critical temperatures or local temperature peaks can occur in the internal combustion engine or cavitation can arise on the intake side of pump 7.

The sealing against valve body 15, 20 can also occur by seals introduced into housing 11. These can be injection molded or inserted mechanically. The seals are elastomers, preferably EPDM (ethylene-propylene-diene rubber) or HNBR (hydrogenated acrylonitrile-butadiene rubber). There are advantageously coated with a friction-reducing material such as PTFE or Parylene or the outer layers of the elastomer contain said compounds. Elastomers can also be used, however, to press a friction-optimized sealing material, e.g., PTFE, elastically against valve body 15, 20.

Preferably, however, a combination of the setting of the spring preload and an adjusting seal can also be used.

Figure 6A:
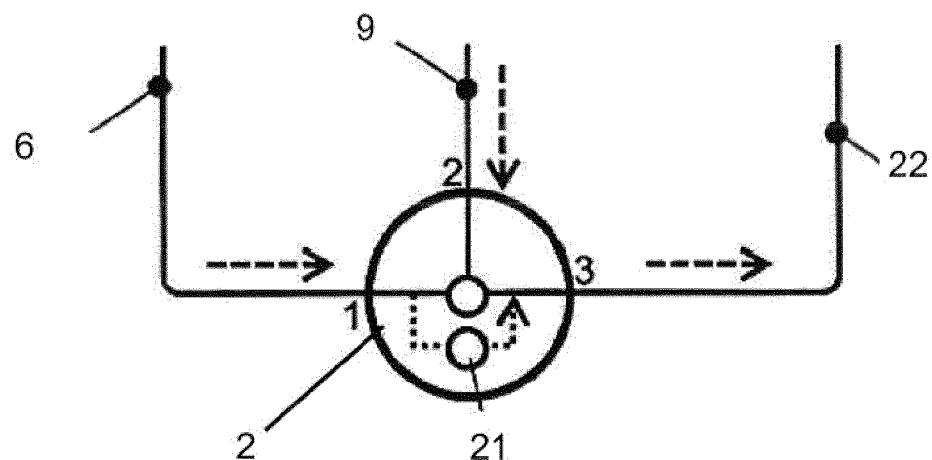
FIGS. 6a and 6b show the use of an expanding wax thermostat in the valve.
Figure 6B:
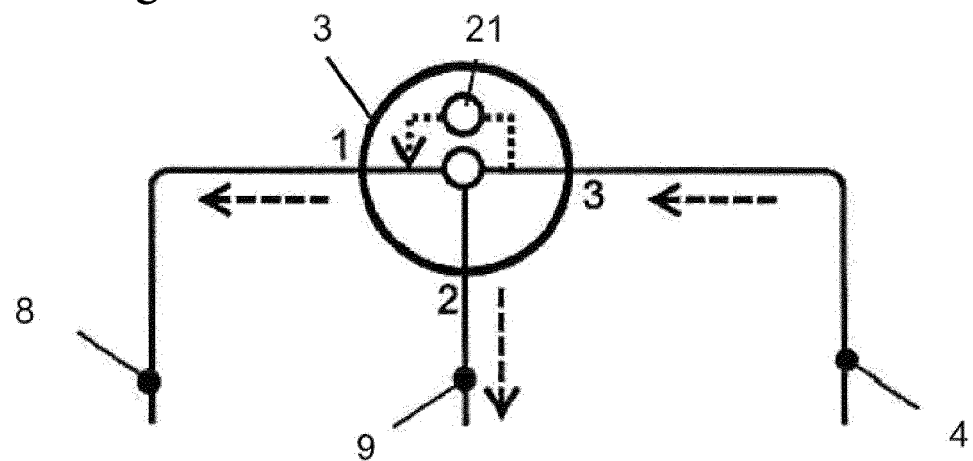

To assure the operational safety of cooling circuit 1 in the case of failure of valve 2, an expanding wax thermostat 21 is inserted into valve 2, as is shown in FIG. 6. The expanding wax thermostat operates here as a fail-safe mechanism. Such expanding wax thermostats 21 assure that there is sufficient cooling of the internal combustion engine when a critical temperature is reached with the simultaneous failure of normal valve operation. Such an expanding wax thermostat 21 is directly dependent on its temperature and thus on the coolant temperature and flow velocity of the coolant around the thermostat. When a critical temperature is reached, the expanding material melts, as a result of which valve 2 is actuated by the expansion of the material's volume during melting. The position of expanding wax thermostat 21 in housing 11 is thereby independent of whether the valve is used as ingress regulator 2 or as egress regulator 3. When used as an ingress regulator, expanding wax thermostat 21 connects the radiator return inlet to pump 7 or engine outlet 4 (FIG. 6a). When used as an egress regulator, thermostat 21 connects engine outlet 4 to radiator inflow 8 of valve 2 (FIG. 6b).

As already explained, the driving of valve body 15 or 20 occurs via an electric motor, which is disposed in an actuator unit together with a gear unit and a sensor for feedback on the position of valve body 15, 20. The electric motor is thereby advantageously a DC motor. Preferably, said actuator unit is attached as an independent part to valve 2. It is especially advantageous in this case, if an outer housing wall of the actuator unit at the same time forms an inner side of housing 11 of valve 2. Thus, on the one hand, the material required for the valve housing can be reduced but, on the other, the number of parts for valve 2 can also be reduced in that, e.g., the shaft bearings and shaft sealing need not be inserted into housing 11 of valve 2 up to the actuator, because they are typically already present in the actuator unit.

The feedback on the position of valve body 15, 20 occurs via a Hall sensor. A Hall switch, which takes a relative measurement of the position of valve body 15, 20 for one or more end positions, but preferably of reference points represented by magnets, can also be used as a cost-effective alternative.

The described valve 2, which because of its simple structure can be used both as an ingress regulator and as an egress regulator in a cooling circuit, can be configured thereby so that only the two switching states, open and closed, are realized. Preferably, however, any desired intermediate state can be realized, especially continuously. Valve 2 therefore is a control element, which depending on the desired operating temperature of one or more parts adjusts the temperature of the coolant by controlling the volumetric flow of the coolant, whereby the volumetric flow can flow over one or more warmer circuits (e.g., bypass circuit) and/or over one or more cooler circuits (e.g., radiator circuit).

A temperature sensor can be disposed in the housing of valve 2. It is possible, further, to dispose the valve together with a coolant pump in a mutual housing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrically drivable valve for controlling volumetric flows in a heating and/or cooling system of a motor vehicle, the valve comprising:
   a housing from which at least an inlet channel of a bypass circuit, an inlet channel of a radiator circuit and an outlet channel of an additional circuit branch off; and
   a disc-shaped valve body rotatable about an axis of a drive shaft and having a single control contour is arranged in the housing, the single control contour of the valve body controlling the bypass circuit and the radiator circuit of the heating and/or cooling system,
   wherein the single control contour is formed as an opening of the valve body that is shaped as a full circle,
   wherein the valve body together with the shaft or only the valve body, is under a preload by at least one resilient element relative to an opening of at least one connecting piece,
   wherein the valve body is a planar element having an upper surface, a lower surface that opposes the upper surface and a lateral side surface that is perpendicular to the upper surface and the lower surface and extends around an outermost periphery of the valve body,
   wherein the opening of the valve body is a through-hole that extends from the upper surface to the lower surface of the valve body,
   wherein the valve body further includes a baffle protruding from the lateral side surface of the valve body, the baffle being a planar tab that protrudes from the lateral side surface in a direction away from the valve body, the direction being parallel to an axial direction of the drive shaft, wherein the baffle protrudes from the lateral side surface such that the baffle extends only partly around the outermost periphery of the valve body, so as to allow control of the additional circuit, and wherein the valve body on its surface is provided with a seal for sealing against the housing or a seal is arranged in the housing to seal the valve body against the housing.

2. The valve according to claim 1, wherein the valve body is formed pivotable relative to the axis.

3. The valve according to claim 1, wherein the valve body is formed of metal or of a coolant-resistant plastic, wherein the plastic contains glass fibers and/or additives that optimize sliding.

4. The valve according to claim 1, wherein an expanding wax thermostat is arranged in the housing as failure protection for the valve.

5. The valve according to claim 1, wherein the housing has connections for the tubes of a separate expanding wax thermostat, the expanding wax thermostat being arranged outside of the housing.

6. The valve according to claim 1, wherein an outer housing wall of an actuator, by which the valve is electrically drivable, forms a wall of the housing of the valve.

7. The valve according to claim 1, wherein a position feedback of the valve body occurs via a Hall sensor or a Hall switch.

8. The valve according to claim 7, wherein reference points of the Hall switch are formed via one or more mechanically formed end positions or via magnets.

9. The valve according to claim 1, wherein the baffle allows control of the additional circuit, such that in a first rotational position of the valve body, the planar tab blocks the outlet channel of the additional circuit and in a second rotational position of the valve body, the planar tab is rotated away from the outlet channel of the additional circuit to open the outlet channel.

* * * * *